United States Patent
Gillespie et al.

(10) Patent No.: US 10,328,525 B2
(45) Date of Patent: Jun. 25, 2019

(54) COATER APPARATUS AND METHOD FOR ADDITIVE MANUFACTURING

(71) Applicant: General Electric Company, Schenectady, NY (US)

(72) Inventors: Shane Matthew Gillespie, Cincinnati, OH (US); Christian Xavier Stevenson, Blanchester, OH (US); Patrick Michael Kenney, Cincinnati, OH (US); Ping Wang, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 14/834,517

(22) Filed: Aug. 25, 2015

(65) Prior Publication Data

US 2017/0057013 A1   Mar. 2, 2017

(51) Int. Cl.
| | |
|---|---|
| *B23K 26/342* | (2014.01) |
| *B33Y 40/00* | (2015.01) |
| *B23K 15/00* | (2006.01) |
| *B33Y 30/00* | (2015.01) |
| *B22F 3/105* | (2006.01) |
| *B29C 64/153* | (2017.01) |
| *B29C 64/20* | (2017.01) |
| *B33Y 10/00* | (2015.01) |

(52) U.S. Cl.
CPC .......... *B23K 26/342* (2015.10); *B22F 3/1055* (2013.01); *B23K 15/0086* (2013.01); *B29C 64/153* (2017.08); *B29C 64/20* (2017.08); *B33Y 30/00* (2014.12); *B22F 2003/1056* (2013.01); *B33Y 10/00* (2014.12); *Y02P 10/295* (2015.11)

(58) Field of Classification Search
CPC ... B33Y 40/00; B23K 26/342; B23K 15/0086
See application file for complete search history.

(56) References Cited

U.S. PATENT DOCUMENTS

| | | | |
|---|---|---|---|
| 5,301,415 A | 4/1994 | Prinz et al. | |
| 5,626,919 A | 5/1997 | Chapman et al. | |
| 6,036,777 A | 3/2000 | Sachs | |
| 6,129,872 A | 10/2000 | Jang | |
| 7,043,330 B2 | 5/2006 | Toyserkani et al. | |
| 7,045,738 B1 | 5/2006 | Kovacevic et al. | |
| 8,444,903 B2 | 5/2013 | Lyons et al. | |
| 2002/0011693 A1* | 1/2002 | Leyden | B29C 41/12 264/401 |
| 2002/0105114 A1 | 8/2002 | Kubo et al. | |

(Continued)

FOREIGN PATENT DOCUMENTS

| | | |
|---|---|---|
| CN | 1726107 A | 1/2006 |
| CN | 101642810 A | 2/2010 |

(Continued)

OTHER PUBLICATIONS

Machine translation of Japan Patent document No. 11-179,572, Nov. 2018.*

(Continued)

*Primary Examiner* — Geoffrey S Evans
(74) *Attorney, Agent, or Firm* — Dority & Manning, P.A.

(57) ABSTRACT

An additive manufacturing apparatus includes: a coater including: at least one trough including a plurality of side-by-side deposition valves.

18 Claims, 12 Drawing Sheets

(56) References Cited

U.S. PATENT DOCUMENTS

| | | | |
|---|---|---|---|
| 2003/0074096 A1 | 4/2003 | Das et al. | |
| 2004/0265413 A1* | 12/2004 | Russell | B41J 2/16532 425/375 |
| 2005/0133527 A1* | 6/2005 | Dullea | B05B 7/14 222/1 |
| 2005/0280185 A1* | 12/2005 | Russell | B28B 1/001 264/308 |
| 2005/0288813 A1* | 12/2005 | Yang | B22F 3/1055 700/119 |
| 2009/0130304 A1 | 5/2009 | Muth et al. | |
| 2010/0078411 A1* | 4/2010 | Hughes | B23K 26/147 219/121.63 |
| 2011/0233808 A1 | 9/2011 | Davidson | |
| 2011/0241240 A1* | 10/2011 | Gothait | B29C 64/245 264/40.6 |
| 2011/0293771 A1* | 12/2011 | Oberhofer | B22F 3/1055 425/182 |
| 2013/0073068 A1* | 3/2013 | Napadensky | B29C 67/0059 700/98 |
| 2014/0050921 A1 | 2/2014 | Lyons et al. | |
| 2014/0088751 A1 | 3/2014 | Pridoehl et al. | |
| 2014/0268604 A1 | 9/2014 | Wicker et al. | |
| 2014/0268607 A1 | 9/2014 | Wicker et al. | |
| 2015/0024319 A1 | 1/2015 | Martin | |
| 2015/0210010 A1 | 7/2015 | Napadensky | |
| 2015/0367419 A1* | 12/2015 | Buller | B23K 26/346 419/53 |
| 2016/0075089 A1* | 3/2016 | Duro Royo | B29C 64/386 264/308 |
| 2017/0021452 A1* | 1/2017 | Tanaka | B29C 70/386 |
| 2017/0203363 A1* | 7/2017 | Rowland | B33Y 30/00 |
| 2017/0203391 A1* | 7/2017 | Budge | B33Y 10/00 |
| 2018/0029291 A1* | 2/2018 | Matzner | B33Y 70/00 |
| 2018/0071984 A1* | 3/2018 | Lee | B33Y 30/00 |

FOREIGN PATENT DOCUMENTS

| | | | |
|---|---|---|---|
| CN | 103480844 A | | 1/2014 |
| CN | 203509029 U | | 4/2014 |
| JP | 11-179572 A | * | 7/1999 |
| JP | 2015-182295 A | | 10/2015 |
| JP | 2015-182303 A | | 10/2015 |
| JP | 2017-039230 A | | 2/2017 |
| WO | 2013021173 | | 2/2013 |
| WO | 2014138386 | | 9/2014 |
| WO | 2014172687 | | 10/2014 |
| WO | 2015094720 | | 6/2015 |

OTHER PUBLICATIONS

M. Ott et al., Multi-Material Processing in Additive Manufacturing, Sep. 23, 2010.

European Search Report and Opinion issued in connection with corresponding EP Application No. 16185131.6 dated Jan. 25, 2017.

Office Action issued in connection with corresponding EP Application No. 16185131.6 dated Apr. 6, 2018.

Office Action issued in connection with corresponding CA Application No. 2939745 dated Jun. 6, 2018.

Machine Translation and Notification of Reasons for Refusal issued in connection with corresponding JP Application No. 2016-159463 dated Sep. 12, 2017.

First Office Action and Search issued in connection with corresponding CN Application No. 201610720841.9 dated Dec. 27, 2017.

* cited by examiner

COATER APPARATUS AND METHOD FOR ADDITIVE MANUFACTURING

BACKGROUND OF THE INVENTION

The present invention relates generally to additive manufacturing, and more particularly to apparatus and methods for additive manufacturing using a powder coater.

Additive manufacturing is a process in which material is built up layer-by-layer to form a component. Unlike casting processes, additive manufacturing is limited only by the position resolution of the machine and not limited by requirements for providing draft angles, avoiding overhangs, etc. as required by casting. Additive manufacturing is also referred to by terms such as "layered manufacturing," "reverse machining," "direct metal laser melting" (DMLM), and "3-D printing." Such terms are treated as synonyms for purposes of the present invention.

A known type of additive manufacturing process involves depositing powdered material onto a worksurface and then fusing the powder using radiant energy. This type of process often requires a large bulk of powder provided as a bed or applied in a continuous large layer. This can waste powder and limit process flexibility.

Accordingly, there is a need for an additive manufacturing process capable of depositing powder in a flexible pattern and/or depositing multiple powders.

BRIEF DESCRIPTION OF THE INVENTION

This need is addressed by an apparatus and method for layered manufacturing of parts incorporating a coater having multiple deposition valves. It may also include reservoirs and be capable of depositing multiple powders.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
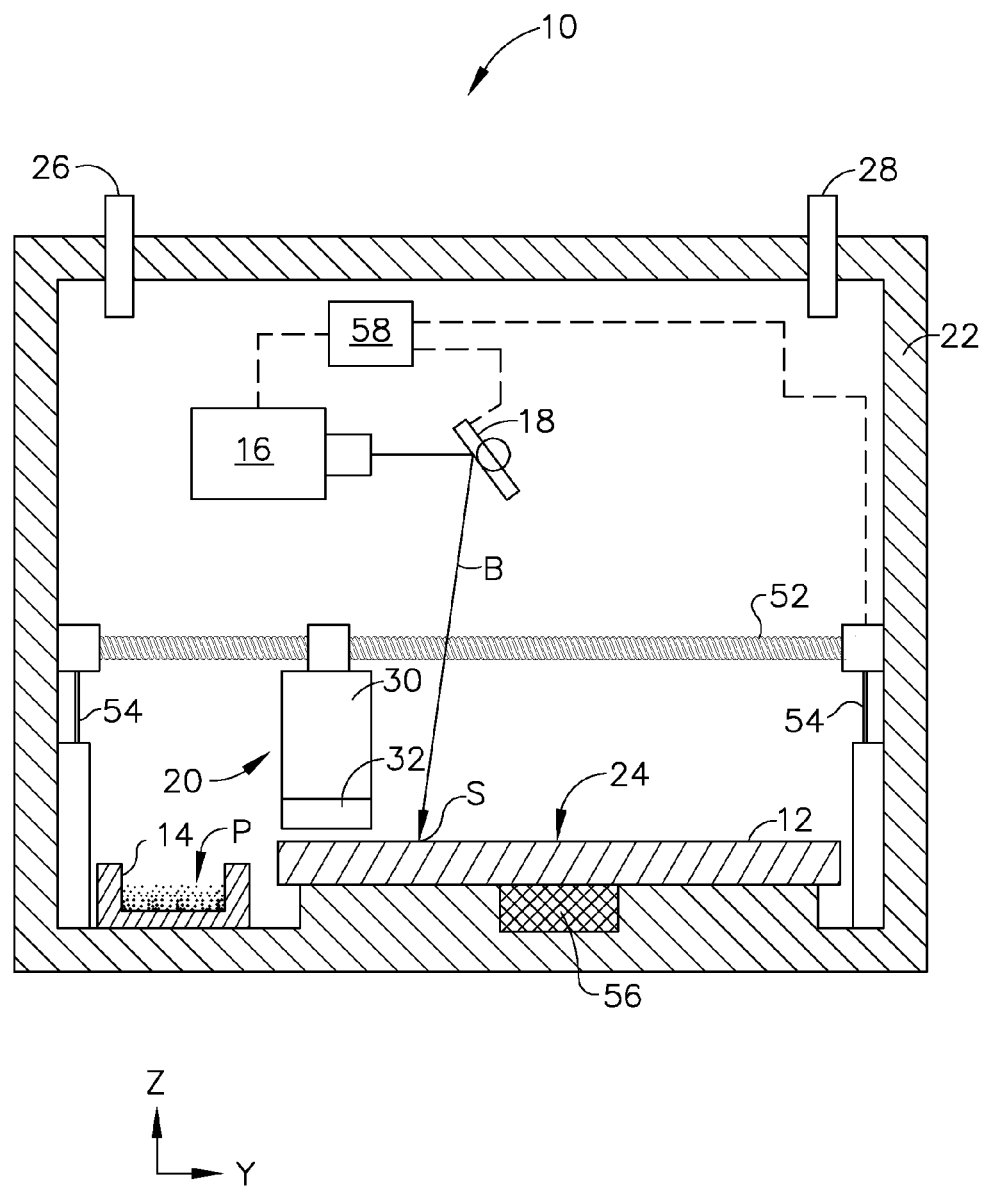
FIG. 1 is a schematic cross-section of an exemplary additive manufacturing apparatus.
Figure 2:
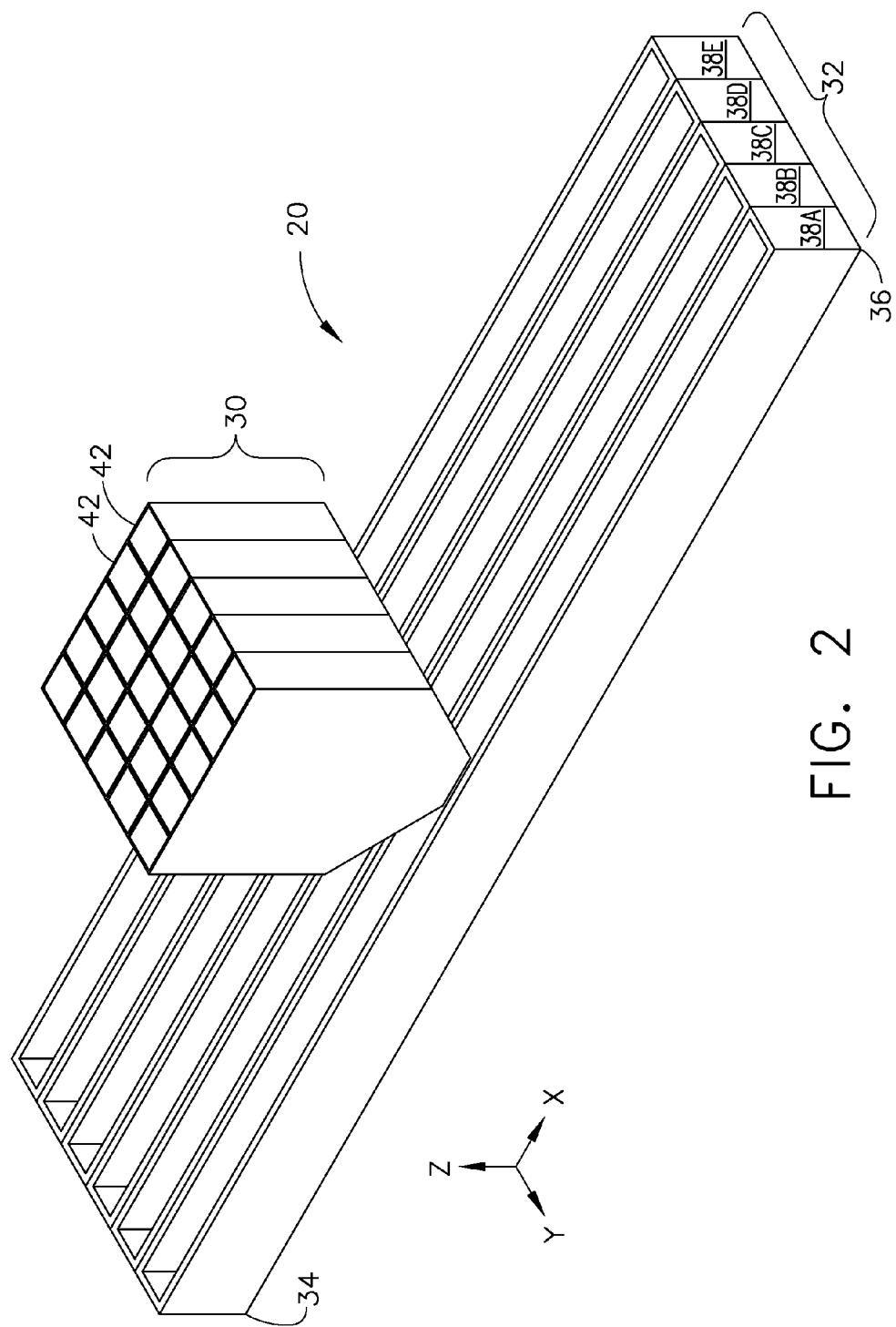
FIG. 2 is a schematic perspective view of a coater usable with the apparatus of FIG. 1.

Referring to the drawings wherein identical reference numerals denote the same FIG. 1 illustrates schematically an exemplary additive manufacturing apparatus 10 suitable for carrying out an additive manufacturing process. The apparatus 10 may include a build platform 12, an excess powder container 14, a directed energy source 16, a beam steering apparatus 18, and a coater 20, all of which may be enclosed in a housing 22. Each of these components will be described in more detail below. In describing the apparatus 10, reference may be made to a system of three mutually perpendicular axes labeled X, Y, and Z as seen in FIGS. 1 and 2. This coordinate system is used merely for convenience and does not imply that any particular orientation of the apparatus 10 is required for operation.

The build platform 12 is a rigid structure providing a planar worksurface 24. The excess powder container 14 is an open-topped vessel which lies adjacent to the build platform 12, and serves as a repository for excess powder P.

The directed energy source 16 is a device producing radiant energy with suitable power and other operating characteristics to melt and fuse the powder during the build process, described in more detail below. For example, the directed energy source 16 may comprise a laser or an electron beam gun.

The beam steering apparatus 18 functions so that a beam "B" from the directed energy source 16 can be focused to a desired spot size and steered to a desired position in an X-Y plane coincident with the worksurface 24. For example, it may comprise one or more mirrors, prisms, and/or lenses and provided with suitable actuators.

The housing 22 encloses the working components of the apparatus 10 and may be sealed to prevent contamination. The housing 22 may be purged with a gas or gas mixture through inlet and outlet ports 26 and 28, respectively.

Figure 3:
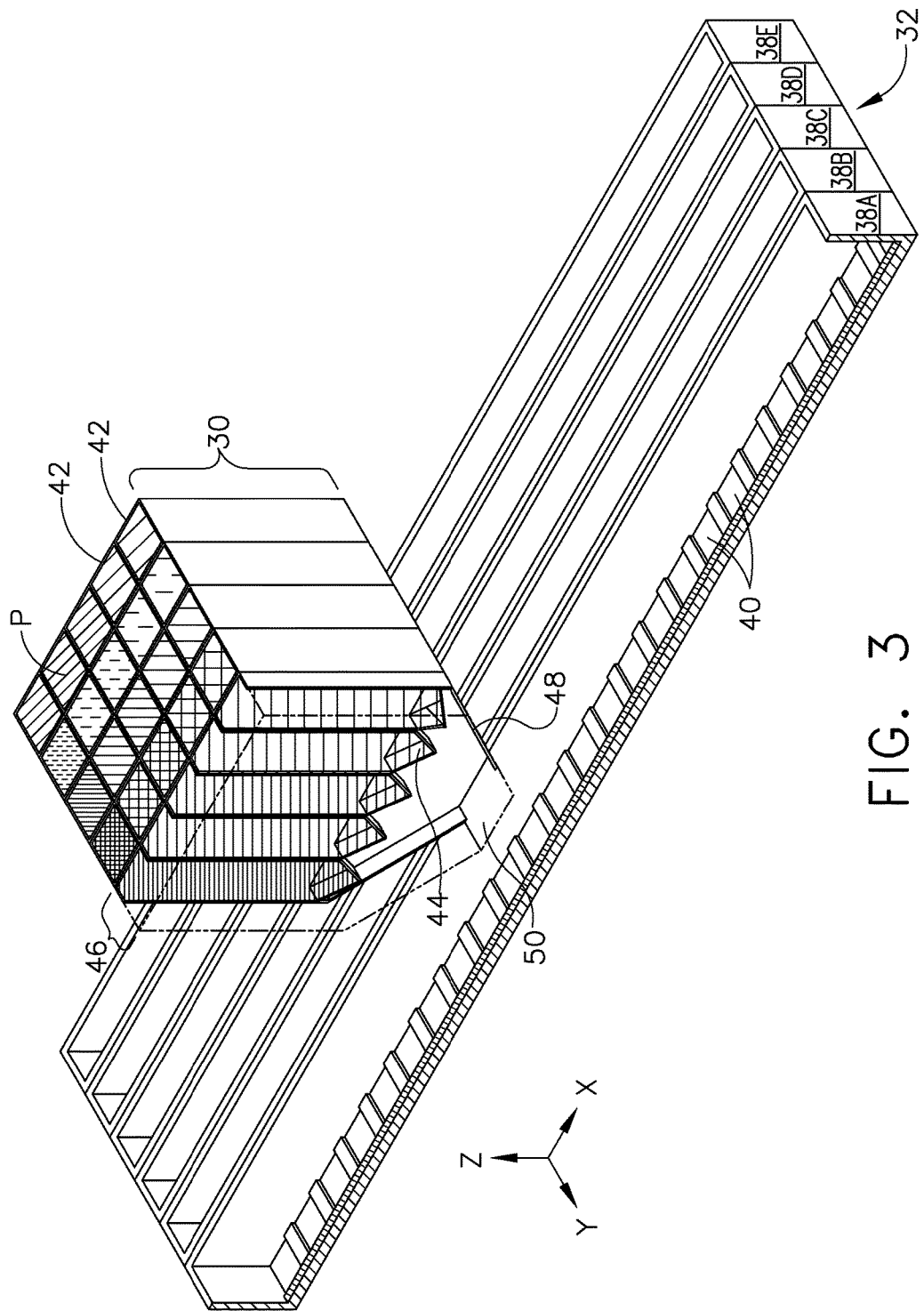
FIG. 3 is a partially-sectioned view of the coater of FIG. 2.

As seen in FIGS. 2 and 3, the coater 20 may include a reservoir assembly 30 positioned above a dispenser 32.

Figure 4:
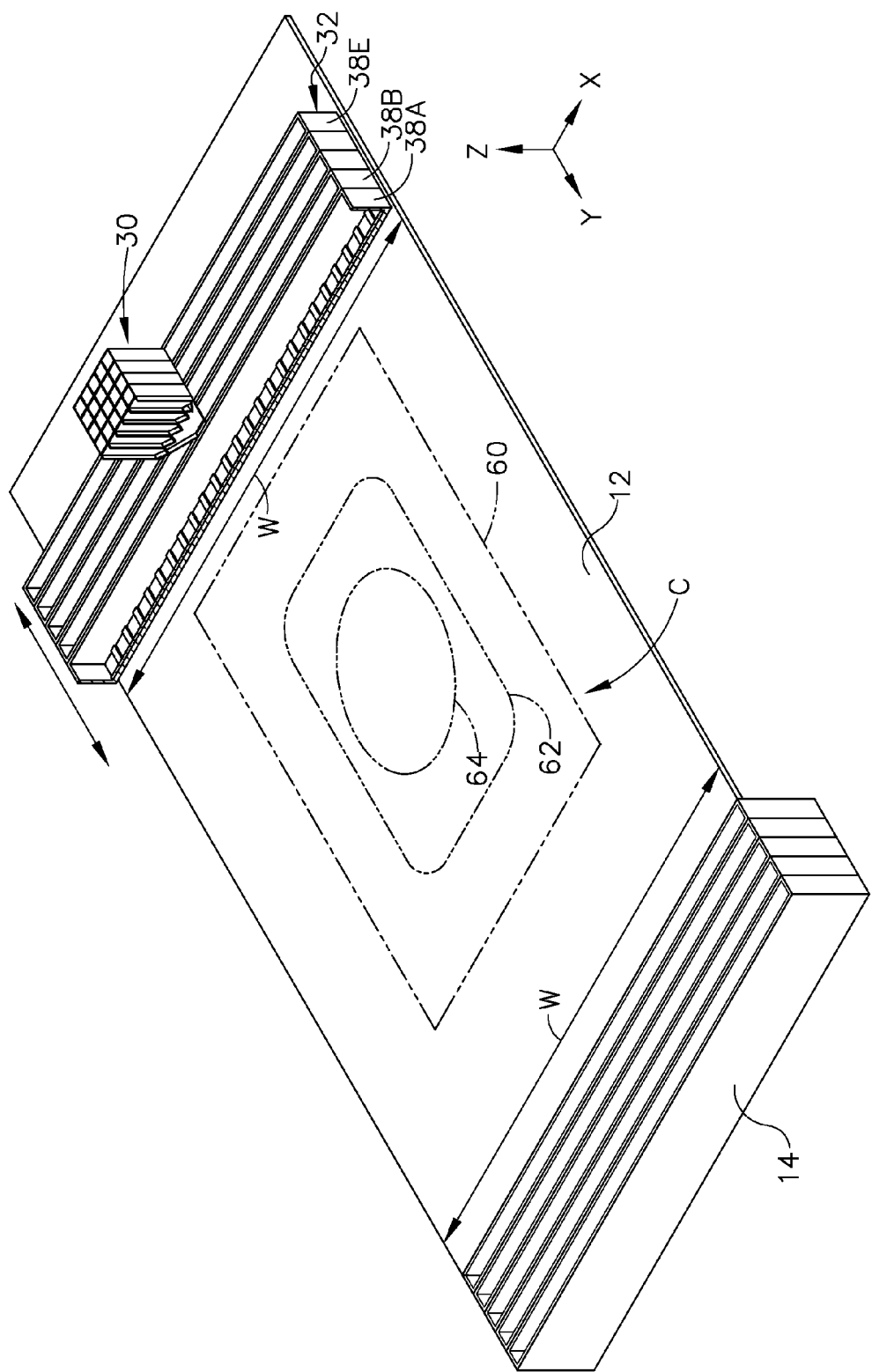
FIG. 4 is a perspective view of the coater of FIG. 2 mounted over a build platform.

The dispenser 32 has a width "W" extending between first and second ends 34, 36 respectively. The width W may be substantially equal to a width W of the build platform 12 in the X direction, as shown in FIG. 4. The dispenser 32 includes one or more elongated troughs (designated 38 generally) extending parallel to the width W. In the illustrated example, the dispenser 32 includes a plurality of troughs 38, specifically five troughs 38A, 38B, 38C, 38D, 38E, in a side-by-side arrangement. As used herein, the term "trough" refers to any structure capable of enclosing powder prior to dispensing it, and does not necessarily imply an open channel structure.

Each trough 38A-E includes one or more deposition valves 40. As used herein the term "valve" means any structure having a first position or condition which permits flow of powdered material (referred to as an "open" state), and a second position or condition which blocks flow of powdered material (referred to as a "closed" state). The action of the deposition valve 40 may be binary (i.e. on-off) or variable (i.e. open to a variable degree). Nonlimiting examples of suitable devices usable as deposition valves 40 include microelectromechanical system ("MEMS") devices or piezoelectric devices. In the illustrated example each trough 38A-E includes a linear array of deposition valves 40 extending along the width W of the dispenser 32. The size of the deposition valves 40 (i.e. their flow area in the open state), the spacing between individual deposition valves 40, and the total number of deposition valves 40 may be selected in order to provide a desired spatial resolution and total coverage area. In use, the amount of powder deposited and resulting powder layer thickness may be controlled by the duration that the deposition valves 40 are open.

The reservoir assembly 30 includes at least one reservoir 42 disposed over each trough 38A-E. Each reservoir 42 is defined by suitable walls or dividers forming a volume effective to store and dispense a powder, referred to generally at "P". Each individual reservoir 42 may be loaded with a powder P having unique characteristics, such as composition and/or powder particle size. It should be appreciated that the powder P may be of any suitable material for additive manufacturing. For example, the powder P may be a metallic, polymeric, organic, or ceramic powder. It is noted that the reservoir assembly 30 is optional and that powder P may be loaded directly into the troughs 38.

Each reservoir 42 may incorporate a feed valve 44 operable to selectively permit flow of powder P from the reservoir 42 into the associated trough 38A-E. The structure of the feed valve 44 may be as described above for the deposition valves 40. The feed valves 44 may be used to selectively flow powder for various purposes, such as for limiting the amount of powder P in the trough 38A-E (to avoid interfering with operation of the deposition valves 40); or for mixing powders from several different reservoirs 42 together in one trough 38A-E.

In the illustrated example, a group of reservoirs 42 are arranged in a side-by-side configuration extending parallel to the width W of the dispenser 32. For convenience of description this group may be referred to as a "column" 46. The reservoirs 42 within the column 46 are grouped above a funnel-shaped collector 48 with a single outlet 50 which discharges into the respective trough 38A-E. One such column 46 and collector 48 may be provided for each trough 38A-E. Alternatively, each reservoir 42 could be positioned to discharge directly into one of the troughs 38A-E.

It is possible to arbitrarily load each reservoir 42 with a unique powder (e.g. a powder having a unique composition and/or particle size). It is also possible to load a group of reservoirs 42 with powders having at least one common property. For example, the reservoirs 42 of a particular column 46 could be loaded with several powders having the same composition but differing powder particle sizes in each individual reservoir 42.

The coater 20 is mounted for controlled movement relative to the build platform 12 in at least one axis parallel to the worksurface 24, such that powder can be dispensed over a selected area of the build platform 12. In the illustrated example, The width W of the dispenser 32 is substantially equal to a width W of the build platform 12, so no movement is required in the X direction in order to dispense powder in a specified location. The coater 20 is mounted to the housing 22 using a first actuator 52 permitting controlled movement in the "length" direction. The first actuator 52 is depicted schematically in FIG. 2, with the understanding that devices such as pneumatic or hydraulic cylinders, ballscrew or linear electric actuators, and so forth, may be used for this purpose.

Optionally, the coater 20 may include apparatus for controlled movement relative to the build platform 12 perpendicular to the worksurface 24 (i.e. Z direction) so as to control the distance between the coater 20 and the worksurface 24. A second actuator 54 is shown schematically for this purpose. Relative movement in the Z direction could be produced by movement of the coater 20, the build platform 12, or some combination of the two.

Optionally, the apparatus may include a vibrator 56 operable to vibrate the build platform 12 and level deposited powder, as described in more detail below. For example, an electromechanical vibrator may be used for this function.

The functions of the apparatus 10 may be implemented using an electronic controller 58 depicted schematically in FIG. 1. For example, one or more processor-based devices such as a microcomputer or programmable logic controller ("PLC") may be used for this purpose. Functional connections of the controller 58 to the other components of the apparatus 10 are shown as single dashed lines.

The apparatus 10 described above is operable to produce a layered component comprising fused powder, where the coater 20 can be used to deposit powder having specified characteristics at each specified location within a layer.

An exemplary build process for a component using the apparatus described above will now be described with reference to FIGS. 4-10. FIG. 4 shows the coater 20 disposed above the build platform 12.

In this example, a first column 46 of the reservoirs 42 is provided with a first powder "P1" to be fed to the first trough 38A, a second column 46 of the reservoirs 42 is provided with a second powder "P2" to be fed to the second trough 38B, and a fifth column 46 of the reservoirs 42 is provided with a third powder "P3" to be fed to the fifth trough 38E.

One layer of a component "C" is depicted as dashed lines. The exemplary layer of the exemplary component C has an outer portion 60, an intermediate portion 62, and an inner portion 64, shown by dashed lines. For purposes of this example, it is assumed that the different portions require powders having different characteristics (e.g. chemical composition and/or powder particle size).

Figure 6:
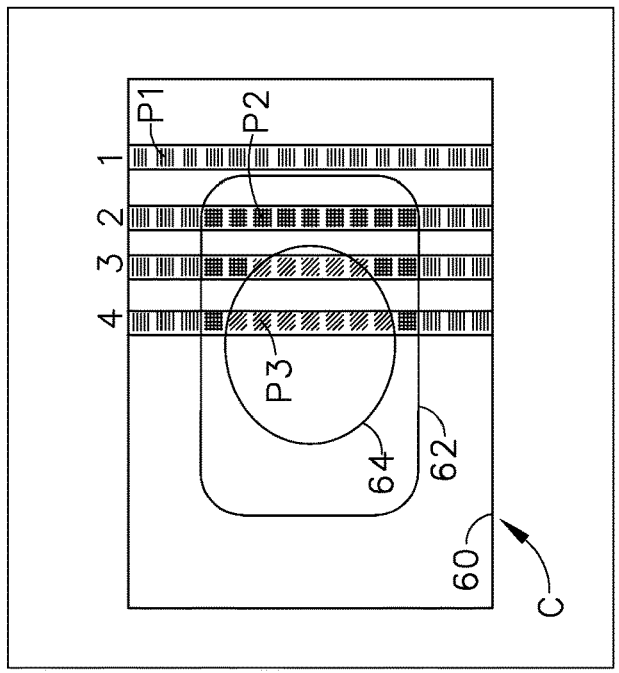
FIG. 6 is a top view of the part of FIG. 5, showing exemplary rows thereof.
Figure 5:
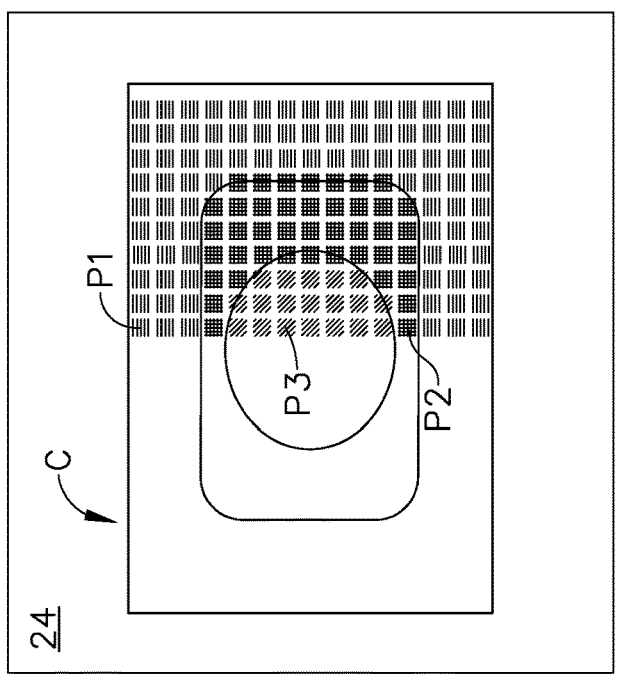
FIG. 5 is a top view of an exemplary part to be constructed.

FIG. 5 shows one-half of the layer of the component C which has been subdivided into a grid 10 elements wide by 15 elements tall. The size of the grid elements and their spacing are exaggerated for purposes of clarity in illustration. The representation of the component C as a series of layers each with a grid of elements may be modeled, for example, using appropriate solid modeling or computer-aided design software. Each unique hatching pattern shown in FIG. 5 represents the characteristics of one unique powder (e.g. composition and/or particle size). FIG. 6 shows four exemplary rows located at arbitrary stations along the Y axis, and denoted 1, 2, 3, and 4.

Figure 7:
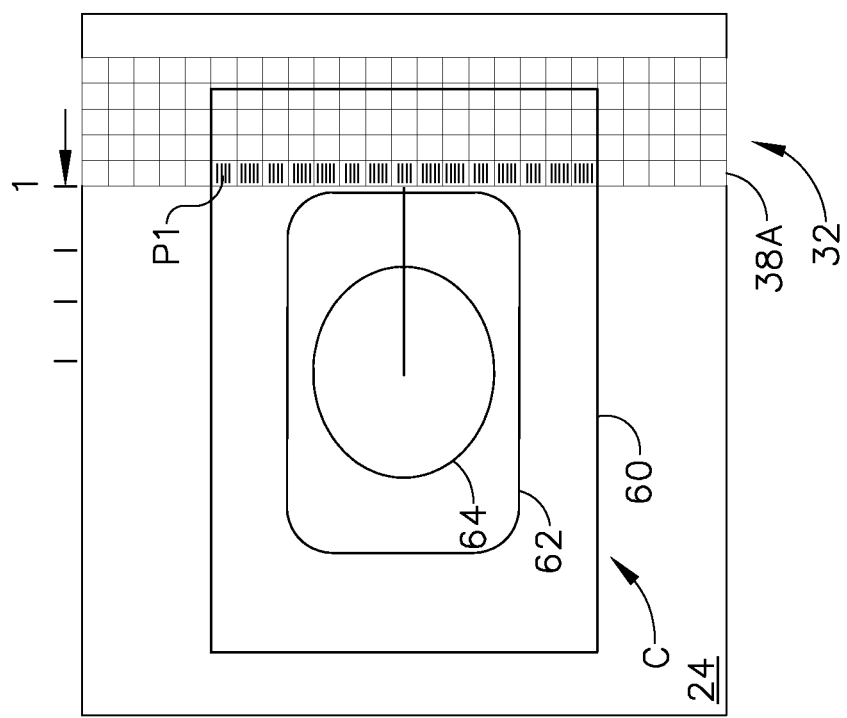
FIGS. 7-10 are schematic top views showing a sequence of powder deposition in the construction of the component shown in FIG. 5.

FIG. 7 illustrates the coater 20 applying the elements of row 1 on the worksurface 24. All 15 elements of row 1 require the first powder "P1". Accordingly, 15 deposition valves 40 of the first trough 38A would be actuated to deposit powder when the first trough 38A is aligned over station 1. The first actuator 52 may be used to move the coater 20 to this position prior to deposition of powder. This movement (and all movements of the coater 20) may be discrete or continuous. In the case of discrete movement, the coater 20 would be stepped to the desired position before actuating the deposition valves 40. In the case of continuous movement, the coater 20 would be set in motion and then the deposition valves would be programmed to actuate at specific times during the movement.

Figure 8:
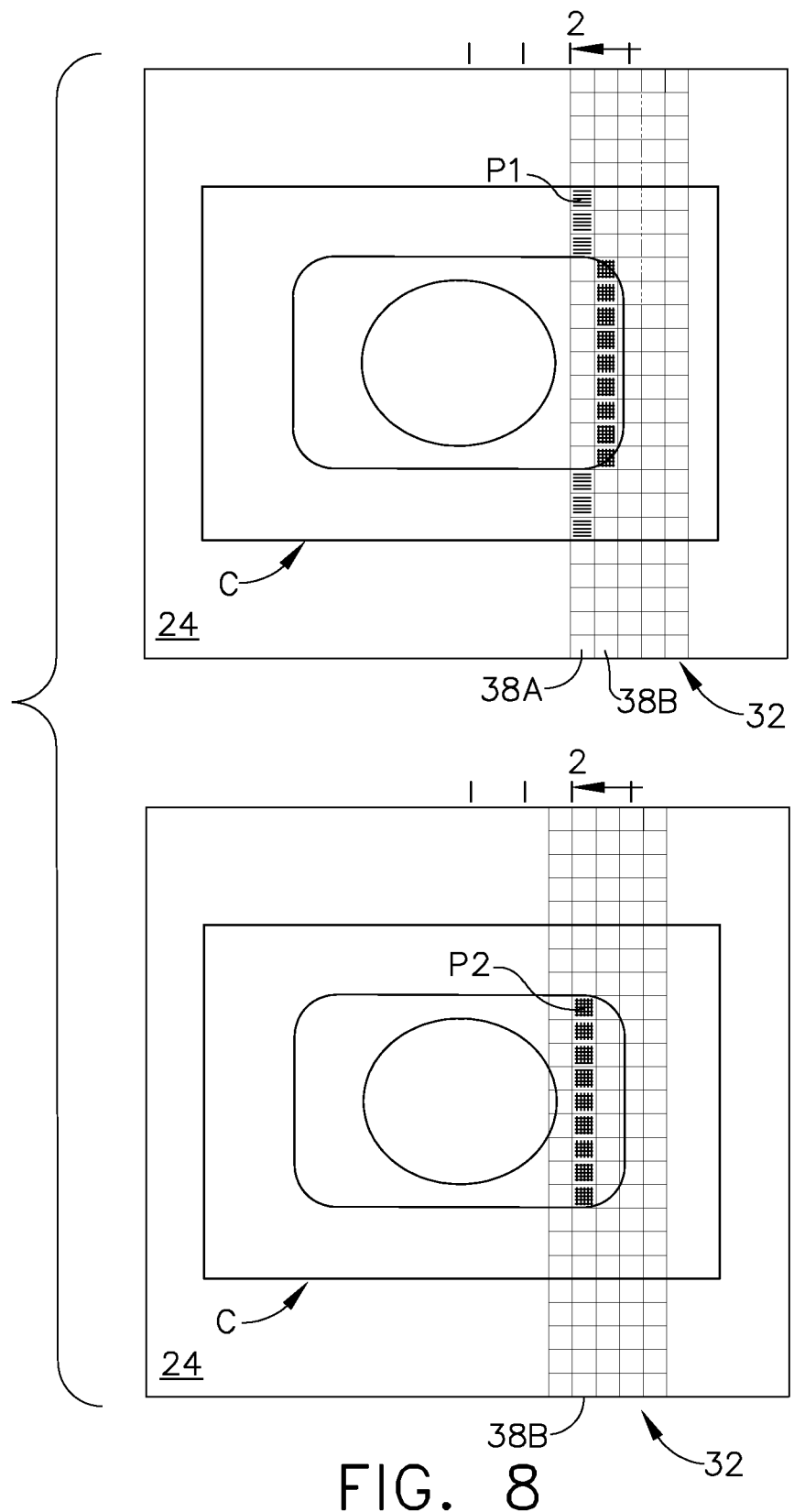

FIG. 8 illustrates the coater 20 applying row 2 on the worksurface. The outer six elements of row 2 require the first powder P1 while the inner nine elements require the second powder P2. Accordingly, six of the deposition valves 40 of the first trough 38A would deposit powder when the first trough 38A is aligned over station 2 (see upper portion of FIG. 8). Subsequently, nine of the deposition valves 40 of the second trough 38B would deposit powder when the second trough 38B is aligned over station 2 (see lower portion of FIG. 8). The two deposition steps complete row 2 as shown in FIG. 6.

Figure 9:
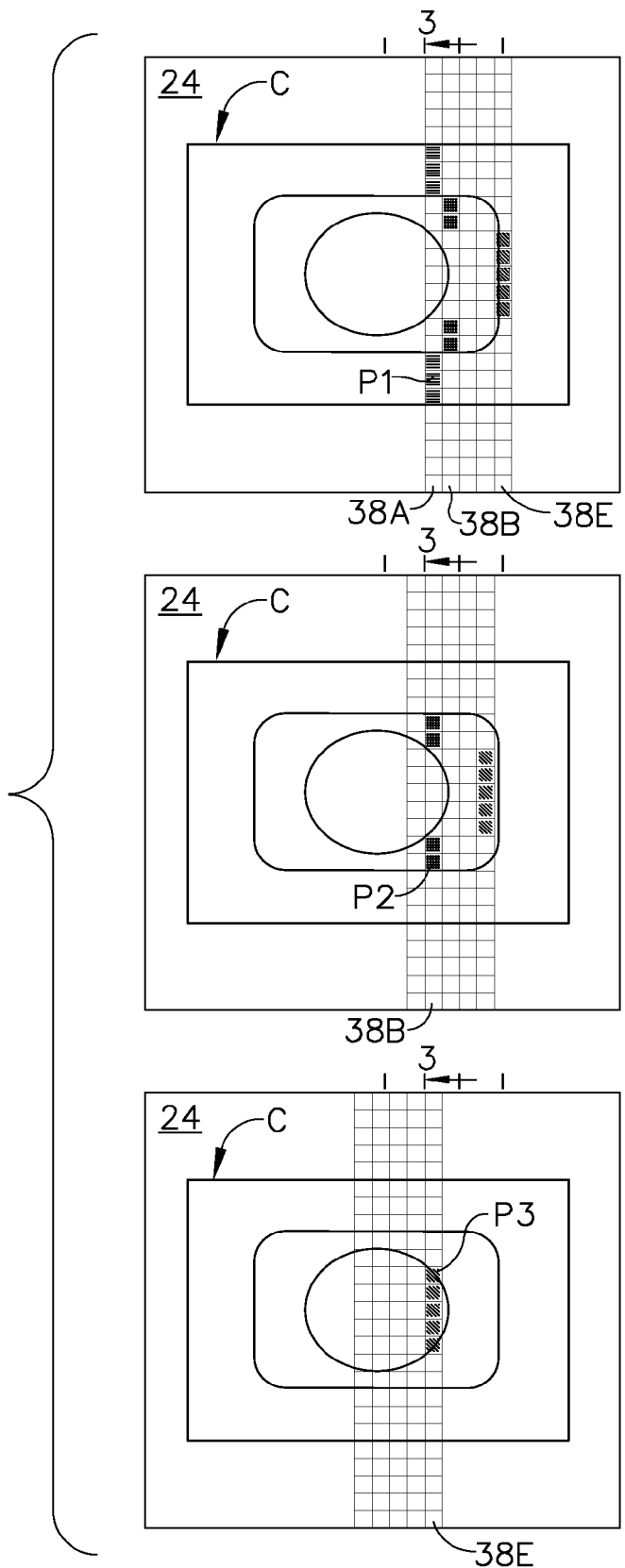

FIG. 9 illustrates the coater 20 applying row 3 on the worksurface. The outer six elements of row 2 require the first powder P1, four intermediate elements require the second powder P2, and the inner five elements require the third powder P3. Accordingly, six of the deposition valves 40 of the first trough 38A deposit powder when the first trough 38A is aligned over station 3 (see upper portion of FIG. 9). Subsequently, four of the deposition valves 40 of the second trough 38B deposit powder when the second trough 38B is aligned over station 3 (see middle portion of FIG. 9). Finally, five of the deposition valves 40 of the fifth trough 38E deposit powder when the fifth trough 38E is aligned over station 3 (see lower portion of FIG. 9). The three deposition steps complete row 3 as shown in FIG. 6.

Figure 10:
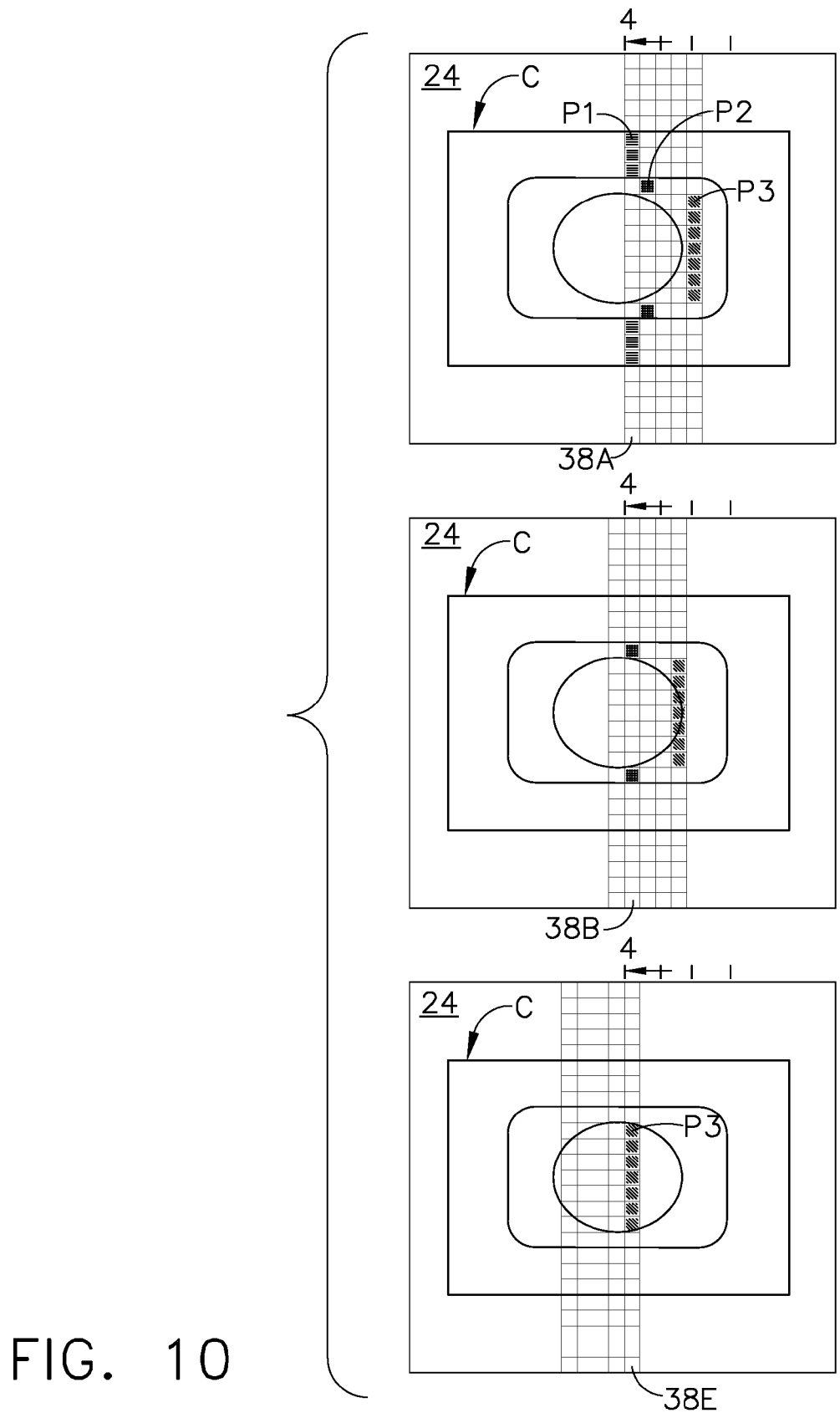

FIG. 10 illustrates the coater 20 applying row 4 on the worksurface. The outer six elements of row 4 require the first powder P1, two intermediate elements require the second powder P2, and the inner seven elements require the third powder P3. Accordingly, six of the deposition valves 40 of the first trough 38A deposit powder when the first trough 38A is aligned over station 4 (see upper portion of FIG. 10). Subsequently, two of the deposition valves 40 of the second trough 38B deposit powder when the second trough 38B is aligned over station 4 (see middle portion of FIG. 10). Finally, seven of the deposition valves 40 of the fifth trough 38E deposit powder when the fifth trough 38E is aligned over station 4 (see upper portion of FIG. 10). The three deposition steps complete row 4 as shown in FIG. 6.

The deposition steps described above would be carried out in a row-by-row fashion as required to complete an entire layer of the component C. Optionally, a device such as the vibrator 56 described above may be used to level the powder and provide a more uniform layer after deposition.

Subsequent to deposition, the directed energy source 16 is used to melt the deposited powder, which may correspond to a two-dimensional cross-section of the component C being built. The directed energy source 16 emits a beam "B" and the beam steering apparatus 18 is used to steer the focal spot "S" of the beam B over the exposed powder surface in an appropriate pattern. The exposed layer of the powder P is heated by the beam B to a temperature allowing it to melt, flow, and consolidate. This step may be described as "fusing" the powder P.

After a layer is fused, the coater 20 is moved vertically apart from the build platform 12 by a layer increment, and another layer of powder deposited as described above. The directed energy source 16 again emits a beam B and the beam steering apparatus 18 is used to steer the focal spot S of the beam B over the exposed powder surface in an appropriate pattern. The exposed layer of the powder P is heated by the beam B to a temperature allowing it to melt, flow, and consolidate both within the top layer and with the lower, previously-solidified layer.

Optionally, it may be desired to purge the troughs 38A-E between cycles of the process, for example where it is desired to deposit different mixtures of powder from previous cycles. This may be accomplished by moving the trough 38A-E over the excess powder container 14 and then opening the deposition valves 40 to dump the excess powder. The process may be augmented by flowing a gas or mixture of gases through the troughs 38A-E.

This cycle of applying powder P and then laser melting the powder P is repeated until the entire component C is complete.

Figure 11:
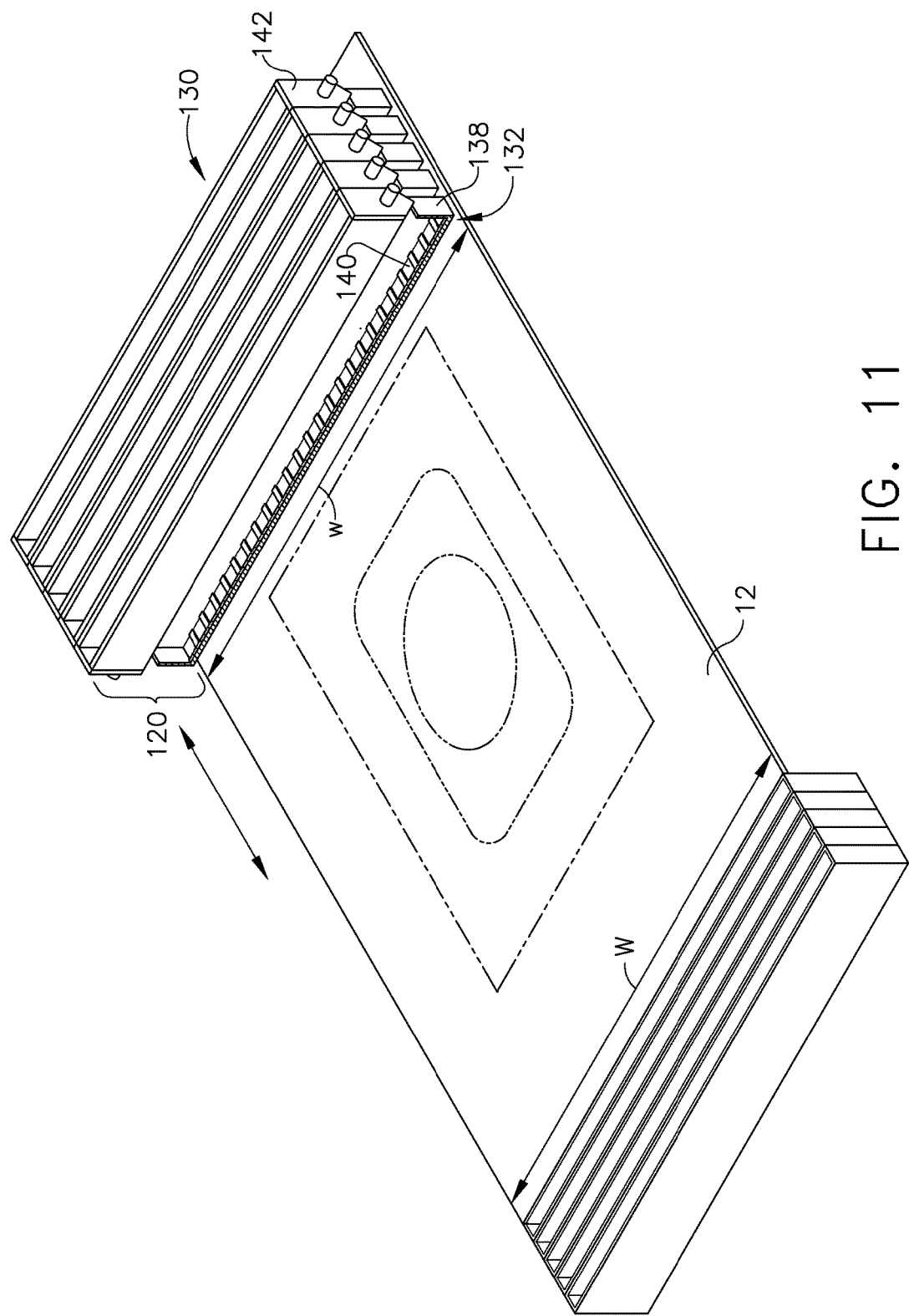
FIG. 11 is a schematic perspective view of an alternative coater usable with the apparatus of FIG. 1.
Figure 12:
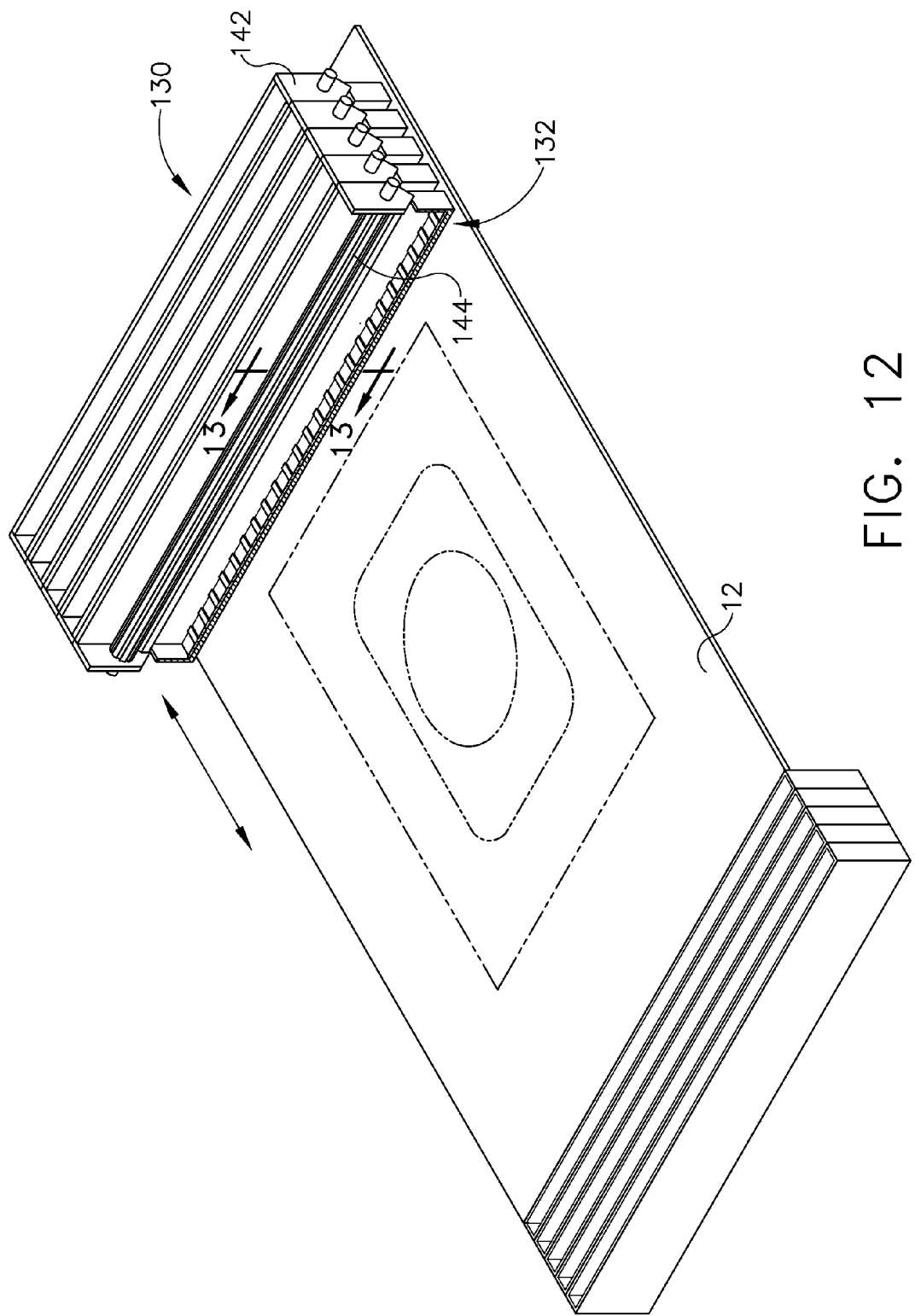
FIG. 12 is a partially-sectioned view of the coater of FIG. 11.
Figure 13:
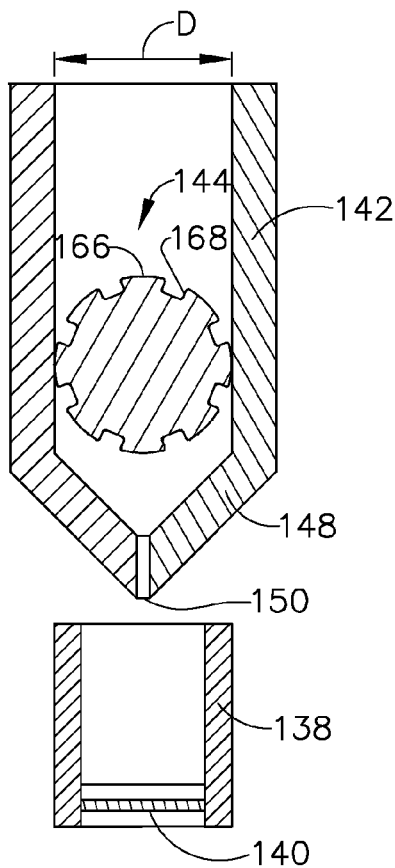
FIG. 13 is a view taken along lines 13-13 of FIG. 12.

FIGS. 11-13 illustrate an alternative coater 120 including a reservoir assembly 130 positioned above a dispenser 132.

The dispenser 132 has a width "W" extending between first and second ends 134, 136 respectively. The width W may be substantially equal to a width W of the build platform 12. The dispenser 132 includes one or more elongated troughs 138 extending parallel to the width W. In the illustrated example, the dispenser includes a plurality of troughs 138 in a side-by-side arrangement.

Each trough 138 includes one or more deposition valves 140. In the illustrated example each trough 138 includes a linear array of deposition valves 140 extending along the width W of the dispenser 132. The size of the deposition valves 140 (i.e. their flow area in the open state), the spacing between individual deposition valves 140, and the total number of deposition valves 140 may be selected in order to provide a desired spatial resolution and total coverage area. In use, the amount of powder deposited and resulting powder layer thickness may be controlled by the duration that the deposition valves 140 are open.

The reservoir assembly 130 includes at least one reservoir 142 disposed over each trough. Each reservoir 142 is defined by suitable walls or dividers forming a volume effective to store and dispense a powder P. It is noted that the reservoir assembly 130 is optional and that powder P may be loaded directly into the troughs 138.

In the illustrated example (see FIG. 13), each reservoir 142 is elongated and extends parallel to the width W of the dispenser 132. The bottom of the each reservoir 142 is shaped into a funnel-shaped collector 148 with a single outlet 150 which discharges into the respective trough 138. One such reservoir 14 is provided for each trough 138.

Each reservoir 142 may incorporate a feed valve 144 operable to selectively permit flow of power from the associated reservoir 142. The feed valves 144 may be used to selectively flow powder for various purposes, such as for limiting the amount of powder P in the trough 138 (to avoid interfering with operation of the deposition valves). The structure of the feed valve 144 may be as described above for the deposition valves 140. In this specific example the feed valve 144 may incorporate a metering function. As seen in FIG. 13, the feed valve 44 comprises an elongated cylinder 166 with a diameter "D" fitting closely to the interior of the reservoir 42. longitudinal grooves 168 are formed into the outer surface of the cylinder 166 and arrayed around its periphery. The cylinder 166 may be rotated at a constant RPM, causing powder P to be metered into the trough 138 at a constant rate.

The apparatus and method described above provides flexibility in the deposition of powder. For example, two or more different powders (varying in composition or particle size) may be blended to produce a powder with intermediate properties before the powder is deposited. Alternatively, two or more different powders may be individually deposited over a common location to result in mixed or graded properties after the powder is fused.

Figure 14:
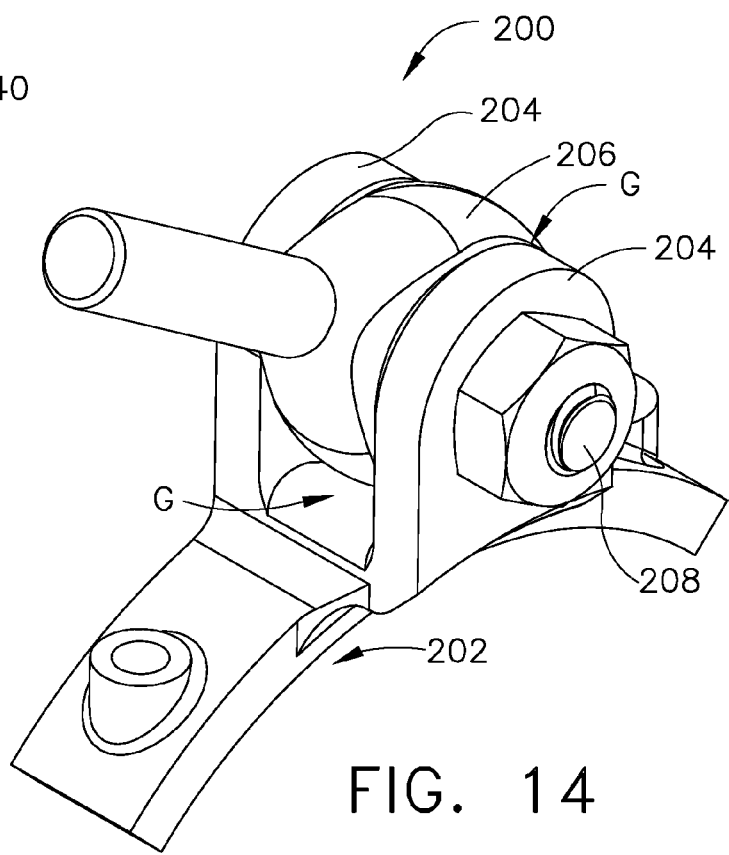
FIG. 14 is an exemplary part constructed using the apparatus described herein.

The apparatus and method described above may be used to construct monolithic or unitary components as well as assemblies of multiple components. For example, FIG. 14 illustrates a mechanical joint assembly 200 including a bracket 202 defining a clevis with a pair of spaced-apart ears 204. A rod-end bearing 206 is disposed between the ears 204 and mounted for pivoting movement by a shaft 208.

Using the apparatus and methods described above, the joint assembly could be manufactured in a single process by including sacrificial support material in the gaps "G" between the individual components. The support material may then be removed after the build process, leaving a working assembly. Nonlimiting examples of sacrificial support materials include unfused powder, low-temperature melting materials, or materials readily dissolved by acids or caustics ("leachable materials").

The foregoing has described apparatus and methods for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An additive manufacturing apparatus, comprising:
a coater comprising:
a plurality of troughs disposed in a side-by-side configuration, wherein each trough of the plurality of troughs includes a plurality of side-by-side deposition valves, and
at least one reservoir communicating with at least one trough of the plurality of troughs, wherein the at least one reservoir includes a feed valve operable to selectively block or permit flow of a powder from the at least one reservoir to the at least one trough.

2. The apparatus of claim 1, wherein the feed valve is configured to meter powder at a constant flow rate.

3. The apparatus of claim 1, wherein a plurality of reservoirs are grouped into a column, each of the reservoirs of the column communicating with a funnel-shaped collector.

4. The apparatus of claim 3, wherein a plurality of the columns are grouped together in a side-by-side fashion, the reservoirs of each column communicating with a funnel-shaped collector, wherein each collector communicates with one of the troughs.

5. The apparatus of claim 1, wherein the coater is mounted for movement along at least one axis above a build platform defining a worksurface.

6. The apparatus of claim 5, further comprising:
an excess powder container disposed adjacent the build platform.

7. The apparatus of claim 5, further comprising:
a directed energy source operable to selectively fuse powder deposited on the worksurface.

8. An additive manufacturing method, comprising:
positioning a coater adjacent a worksurface, the coater comprising a trough including a plurality of side-by-side deposition valves;
depositing powder from the trough onto the build platform through at least one of the deposition valves; and
using radiant energy to fuse the powder.

9. The method of claim 8 wherein the step of depositing powder includes:
depositing powder from the through onto the build platform through at least one of the deposition valves while the coater is in a first position;
moving the coater to a new position; and
repeating the steps of depositing powder and moving the coater to build up a layer of powder on the build platform.

10. The method of claim 8 further comprising vibrating the deposited powder to level it before fusing.

11. The method of claim 8 wherein the coater includes a plurality of troughs in a side-by-side arrangement, each trough including a plurality of side-by-side deposition valves, and the step of depositing powder includes:
moving the coater to position a selected one of the troughs in a first position;
depositing powder from the selected trough onto the build platform through at least one of the deposition valves thereof; and
repeating the steps of moving the coater and depositing powder, using two or more of the troughs, such that the deposits of the powders from each of the troughs lie in a single row.

12. The method of claim 11 wherein the step of depositing powder further comprises repeating the steps of moving the coater and depositing powder to build up a layer of powder on the build platform.

13. The method of claim 11 wherein the powder deposited by each trough differs from the powder deposited by the other troughs in at least one of its composition or particle size.

14. The method of claim 8 wherein the coater comprises a reservoir communicating with the at least one trough, the reservoir including a feed valve operable to selectively block or permit flow of a powder from the reservoir to the trough, the method further comprising using the feed valve to flow a controlled quantity of powder from the reservoir to the trough.

15. The method of claim 8 wherein the coater comprises a reservoir communicating with the at least one trough, the reservoir including a feed valve operable to selectively block or permit flow of a powder from the reservoir to the trough, the method further comprising using the feed valve to flow a powder from the reservoir to the trough at a controlled rate.

16. The method of claim 8 wherein:
the coater comprises two or more troughs each including a plurality of side-by-side deposition valves;
the coater comprises two or more reservoirs communicating with each trough, each reservoir including a feed valve operable to selectively block or permit flow of a powder from the reservoir to the corresponding trough; and
wherein the method further comprises using the feed valves to flow a mixture of powders from the reservoir to the trough, wherein each of the powders of the mixture differs from the other powders of the mixture in at least one of its composition or particle size.

17. The method of claim 16 wherein a plurality of the reservoirs are grouped into a column, each of the reservoirs of the column communicating with a funnel-shaped collector, wherein each collector communicates with one of the troughs.

18. An additive manufacturing apparatus, comprising:
a coater comprising:
at least one trough disposed in a side-by-side configuration, wherein the at least one trough includes a plurality of side-by-side deposition valves, and
a group of reservoirs arranged in a side-by-side configuration extending parallel to the width W of the dispenser, wherein at least one reservoir of the group of reservoirs includes a feed valve operable to selectively block or permit flow of a powder from the reservoir to the trough.

* * * * *